(12) United States Patent
Paas et al.

(10) Patent No.: US 8,380,134 B2
(45) Date of Patent: *Feb. 19, 2013

(54) SYSTEM, METHOD AND MOBILE DEVICE FOR DISPLAYING WIRELESS MODE INDICATORS

(75) Inventors: Julian Paas, Mississauga (CA); Joel Paul Steele, Richmond Hill (CA); Giang Manh La, Mississauga (CA); Sherryl Lee Lorraine Scott, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/424,521

(22) Filed: Mar. 20, 2012

(65) Prior Publication Data

US 2012/0178427 A1    Jul. 12, 2012

Related U.S. Application Data

(63) Continuation of application No. 13/173,444, filed on Jun. 30, 2011, now Pat. No. 8,160,504, which is a continuation of application No. 12/834,254, filed on Jul. 12, 2010, now Pat. No. 8,005,434, which is a continuation of application No. 11/744,427, filed on May 4, 2007, now Pat. No. 7,756,485.

(60) Provisional application No. 60/865,562, filed on Nov. 13, 2006.

(51) Int. Cl.
*H04B 17/00* (2006.01)

(52) U.S. Cl. .................... 455/67.7; 455/67.11; 455/566; 455/412.3

(58) Field of Classification Search ................ 455/67.7, 455/67.11, 566, 412.3, 115.3, 161.3, 226.2, 455/158.2, 158.4
See application file for complete search history.

(56) References Cited

U.S. PATENT DOCUMENTS

| | | | |
|---|---|---|---|
| 5,613,213 A | | 3/1997 | Naddell et al. |
| 6,011,978 A | * | 1/2000 | Ault et al. ................. 455/552.1 |
| 6,516,202 B1 | * | 2/2003 | Hawkins et al. ........... 455/556.2 |
| 6,559,773 B1 | * | 5/2003 | Berry ......................... 340/815.4 |
| 6,888,808 B2 | * | 5/2005 | Jagadeesan et al. .......... 370/328 |
| 6,917,817 B1 | * | 7/2005 | Farrow et al. ................. 455/557 |
| 6,947,772 B2 | * | 9/2005 | Minear et al. ................ 455/566 |
| 7,082,301 B2 | * | 7/2006 | Jagadeesan et al. .......... 455/436 |

(Continued)

FOREIGN PATENT DOCUMENTS

| | | |
|---|---|---|
| CA | 2613153 | 10/2012 |
| EP | 1376430 | 2/2004 |

(Continued)

OTHER PUBLICATIONS

Canadian Notice of Allowance, Canadian Patent Application No. 2,613,153, dated Mar. 22, 2012.

(Continued)

*Primary Examiner* — Minh D Dao

(74) *Attorney, Agent, or Firm* — Bereskin & Parr LLP/S.E.N.C.R.L., s.r.l.

(57) ABSTRACT

Embodiments relate to a mobile device comprising: a processor; a display responsive to the processor; a plurality of wireless communication subsystems responsive to the processor; and a memory. The memory is accessible to the processor and stores program code executable by the processor for executing a user interface application. The user interface application is configured to determine a first connection status of the mobile device with respect to a cellular network and a second connection status with respect to a wireless local area network (WLAN). The user interface application, when executed by the processor, is further configured to cause the display to display a selected combination of icons in three display fields in a banner area of the display. The combination of icons is selected from a plurality of icon combinations based on the determined first connection status and the second connection status.

19 Claims, 7 Drawing Sheets

U.S. PATENT DOCUMENTS

| | | | |
|---|---|---|---|
| 7,133,669 B2* | 11/2006 | Nair et al. | 455/432.1 |
| 7,245,917 B2* | 7/2007 | Chiueh | 455/442 |
| 7,310,527 B2* | 12/2007 | Jagadeesan et al. | 455/436 |
| 7,382,247 B2* | 6/2008 | Welch et al. | 340/539.12 |
| 7,411,911 B2* | 8/2008 | Huotari et al. | 370/236 |
| 7,756,485 B2 | 7/2010 | Paas et al. | |
| 8,005,434 B2* | 8/2011 | Paas et al. | 455/67.7 |
| 8,160,504 B2 | 4/2012 | Paas et al. | |
| 2001/0026609 A1 | 10/2001 | Weinstein | |
| 2002/0065941 A1 | 5/2002 | Kaan et al. | |
| 2003/0007464 A1 | 1/2003 | Balani | |
| 2004/0058652 A1* | 3/2004 | McGregor et al. | 455/67.13 |
| 2004/0076177 A1 | 4/2004 | Koch et al. | |
| 2004/0102192 A1* | 5/2004 | Serceki | 455/434 |
| 2004/0192221 A1* | 9/2004 | Matsunaga | 455/76 |
| 2004/0248547 A1 | 12/2004 | Philsgard et al. | |
| 2004/0259060 A1 | 12/2004 | Kumar et al. | |
| 2005/0037787 A1* | 2/2005 | Bachner et al. | 455/502 |
| 2005/0086492 A1* | 4/2005 | Nicodemus et al. | 713/182 |
| 2005/0091693 A1* | 4/2005 | Amine et al. | 725/100 |
| 2005/0153661 A1* | 7/2005 | Beck | 455/73 |
| 2005/0227700 A1* | 10/2005 | Kirkland et al. | 455/453 |
| 2005/0232247 A1 | 10/2005 | Whitley et al. | |
| 2007/0078981 A1* | 4/2007 | Alberth et al. | 709/225 |
| 2007/0094374 A1* | 4/2007 | Karia et al. | 709/223 |
| 2007/0123194 A1* | 5/2007 | Karaoguz et al. | 455/403 |
| 2007/0285258 A1* | 12/2007 | Hartman | 340/573.1 |
| 2008/0039040 A1* | 2/2008 | Patel et al. | 455/226.2 |
| 2008/0046542 A1* | 2/2008 | Sano | 709/218 |
| 2008/0113665 A1 | 5/2008 | Paas et al. | |
| 2008/0113683 A1 | 5/2008 | Paas et al. | |
| 2008/0167078 A1* | 7/2008 | Eibye | 455/566 |
| 2008/0291161 A1* | 11/2008 | Massie et al. | 345/156 |
| 2008/0295017 A1* | 11/2008 | Tseng et al. | 715/777 |
| 2009/0111485 A1* | 4/2009 | Kitani | 455/456.1 |
| 2009/0222842 A1* | 9/2009 | Narayanan et al. | 719/328 |
| 2009/0234953 A1* | 9/2009 | Braslavsky | 709/227 |
| 2009/0252131 A1* | 10/2009 | Itoh | 370/338 |
| 2009/0257412 A1* | 10/2009 | Kuokkanen | 370/338 |
| 2011/0256903 A1 | 10/2011 | Paas et al. | |

FOREIGN PATENT DOCUMENTS

| | | |
|---|---|---|
| EP | 1420569 | 5/2004 |
| EP | 1691260 | 8/2006 |
| EP | 1761096 | 3/2007 |
| EP | 1921832 | 3/2009 |
| EP | 2047700 | 9/2010 |
| KR | 0987489 | 10/2010 |

OTHER PUBLICATIONS

Indian Office Action, Indian Patent Application No. 5608/CHENP/2007, dated Feb. 20, 2012.

Chinese Certificate of Grant, Chinese Patent No. ZL200780000682.4 dated Mar. 28, 2012.

Co-pending U.S. Appl. No. 11/626,001, System Method and Mobile Device for Management of Wireless Connections, filed Jan. 23, 2007.

Canadian Office Action, Canadian Patent Application No. 2,613,153, dated Feb. 9, 2011.

Chinese Office Action, Chinese Patent Application No. 200780000682.4, dated Jan. 12, 2011.

European Communication of Intention to Grant, European Patent Application No. 07719713.5, dated Mar. 30, 2010.

European Notice of Intent to Grant for European Patent Application No. 07101033.4, dated Oct. 7, 2008.

European Search Report for EP application No. 07719713.5, dated Oct. 1, 2009.

European Search Report for EP patent application No. 07101033.4, dated Sep. 12, 2007.

International Preliminary Report on Patentability for PCT application No. PCT/CA2007/000788, dated May 28, 2009.

Korean Notice of Decision for Patent, Korean patent Application No. 10-2008-7000154, dated Aug. 27, 2010.

Korean Office Action, Korean Patent Application No. 10-2008-7000154, dated Jan. 1, 2010.

United States Office Action for U.S. Appl. No. 11/626,001, dated Jan. 6, 2010.

United States Office Action for U.S. Appl. No. 11/626,001, dated Jun. 25, 2010.

United States Office Action Response for U.S. Appl. No. 11/626,001, dated Apr. 5, 2010.

United States Office Action Response for U.S. Appl. No. 11/626,001, dated Sep. 21, 2010.

United States Office Action Response for U.S. Appl. No. 11/626,001, dated May 24, 2011.

United States Office Action, U.S. Appl. No. 11/626,001, dated Jan. 25, 2011.

International Search Report/Written Opinion for PCT application No. PCT/CA2007/000788, dated Sep. 20, 2007.

New IP phone hipi brought to market, excerpted from Chinese Magazine, Computer Week, Mar. 27, 2006.

Rim, WIFI Comparison, IBM ThinkPad to Potential Blackberry WIFI Wizard screenshots:, Aug. 2006.

United States Office Action, U.S. Appl. No. 11/626,001, dated Oct. 19, 2011.

United States Office Action for U.S. Appl. No. 13/173,444, dated Oct. 7, 2011.

Chinese office Action, Chinese Patenet Application No. 200780000682.4, dated Aug. 30, 2011.

Co-pending U.S. Appl. No. 13/173,444, System Method and Mobile Device for Displaying Wireless Mode Indicators, filed Aug. 22, 2011.

United States Office Action Response for U.S. Appl. No. 13/173,444, dated Dec. 1, 2011.

United States Office Action Response and RCE for U.S. Appl. No. 11/626,001, dated Dec. 16, 2011.

Chinese Notification of Grant, Chinese Patent Application No. 200780000682.4, dated Jan. 11, 2012.

United States Notice of Allowance dated Mar. 5, 2010, U.S. Appl. No. 11/744,427.

United States Notice of Allowance, U.S. Appl. No. 12/834,254, dated Mar. 21, 2011.

United States Office Action dated Oct. 30, 2009, U.S. Appl. No. 11/744,427.

United States Office Action Response dated Jan. 27, 2010, U.S. Appl. No. 11/744,427.

United States Office Action Response, U.S. Appl. No. 12/834,254, dated Dec. 21, 2010.

United States Office Action, U.S. Appl. No. 12/834,254, dated Jan. 14, 2011.

United States Office Action, U.S. Appl. No. 12/834,254, dated Oct. 14, 2010.

United States Notice of Allowance, U.S. Appl. No. 13/173,444, dated Dec. 15, 2011.

United States Supplemental Notice of Allowability, U.S. Appl. No. 13/173,444, dated Dec. 30, 2011.

United States Supplemental Notice of Allowability, U.S. Appl. No. 13/173,444, dated Jan. 3, 2012.

United States Supplemental Notice of Allowability, U.S. Appl. No. 13/173,444, dated Feb. 6, 2012.

United States Office Action Response, U.S. Appl. No. 12/834,254, dated Jan. 26, 2011.

RCE, U.S. Appl. No. 12/834,254, dated Mar. 9, 2011.

United States Amendment After Allowance, U.S. Appl. No. 12/834,254, dated Jun. 20, 2011.

United States Response to Amendment, U.S. Appl. No. 12/834,254, dated Jul. 25, 2011.

Response dated Dec. 4, 2009, European Application No. 07719713.5.

Canadian Patent Certificate dated Oct. 16, 2012.

* cited by examiner

SYSTEM, METHOD AND MOBILE DEVICE FOR DISPLAYING WIRELESS MODE INDICATORS

CROSS-REFERENCE TO RELATED APPLICATIONS

This application is a continuation of U.S. patent application Ser. No. 13/173,444, filed Jun. 30, 2011, which is a continuation of U.S. patent application Ser. No. 12/834,254, filed Jul. 12, 2010, which is a continuation of U.S. patent application Ser. No. 11/744,427, filed on May 4, 2007, which claims the benefit of U.S. Provisional Application No. 60/865,562, filed on Nov. 13, 2006. U.S. patent application Ser. No. 11/744,427 issued to patent as U.S. Pat. No. 7,756,485. U.S. patent application Ser. No. 12/834,254 issued to patent as U.S. Pat. No. 8,005,434. The entire contents of U.S. application Ser. Nos. 13/173,444, 12/834,254, U.S. application Ser. No. 11/744,427 and of U.S. Application No. 60/865,562 are hereby incorporated by reference.

TECHNICAL FIELD

The described embodiments relate to a mobile device configured to display wireless mode indicators and systems and methods therefor.

BACKGROUND

Mobile device technology has reached the point where many mobile devices are capable of communicating over more than one type of wireless connection. For example, a mobile device may have a cellular connection with a nearby cellular base station of a wireless telecommunications carrier. Additionally, the mobile device may be capable of communicating within a wireless local area network (WLAN). In some instances, the mobile device may be capable of communicating to the same network node via either the cellular network or the WLAN.

Where wireless connections are available simultaneously through a cellular network and a WLAN, it can be important for a user of a mobile device to have knowledge of this fact as the type of wireless connection can substantially affect the cost of the services provided to that user. For example, the service charges applied to connections through the WLAN are commonly less than those applied to accessing the same node through the cellular network.

In an environment where multiple different services may be sought to be accessed by a mobile device user, such as a voice call, a data transmission, service, internet access service and an email service, it can be desirable to determine which services are available at a given time and through which network connection they can be accessed. Whether such services are available, and at what cost, will depend on the location of the mobile device and the type of wireless infrastructure available at that location.

The described embodiments attempt to address or ameliorate one or more shortcomings of existing aspects of existing mobile device technology, or to at least provide a useful alternative thereto.

BRIEF DESCRIPTION OF THE DRAWINGS

For a better understanding of the described embodiments and to show more clearly how the may be carried into effect, reference will now be made, by way of example, to the accompanying drawings in which.

DETAILED DESCRIPTION

Figure 1:
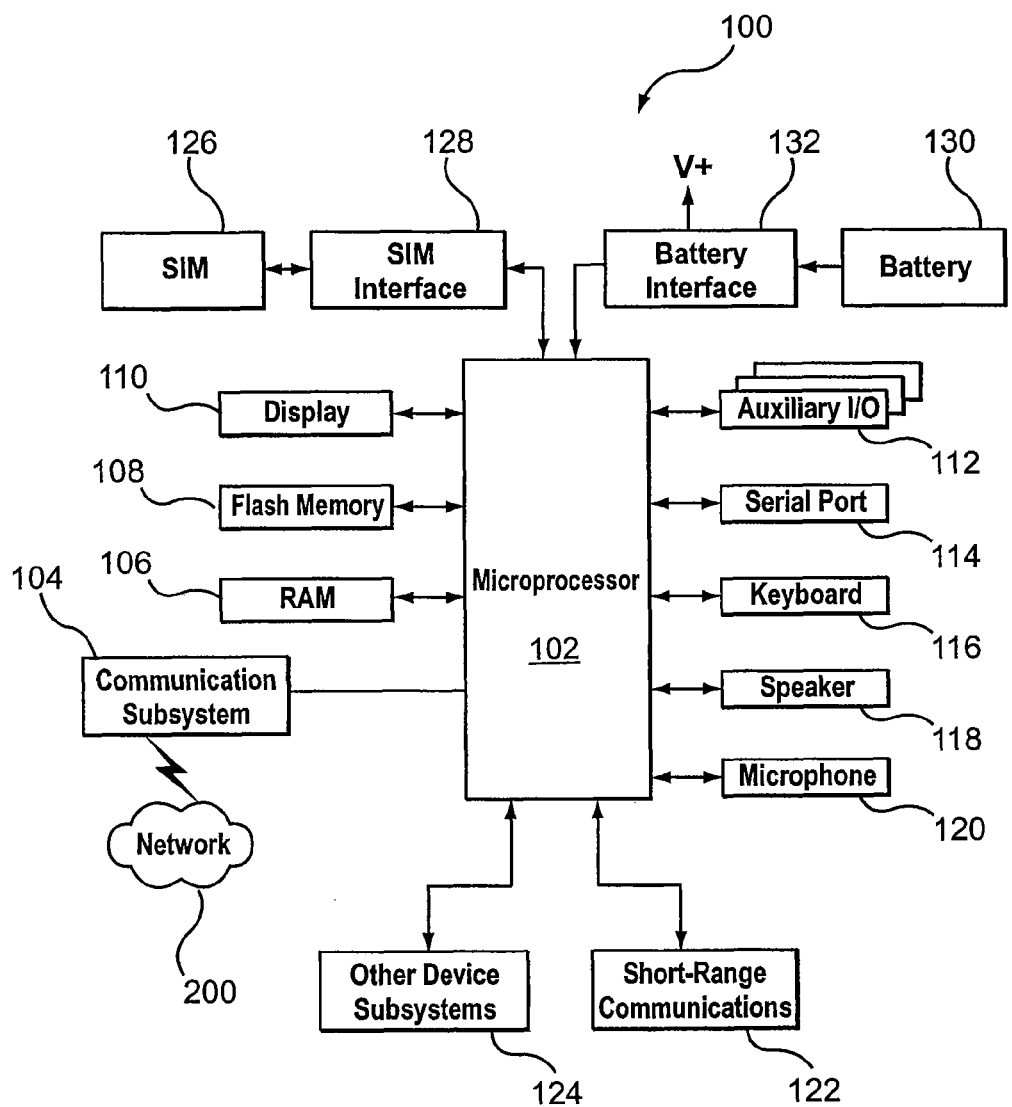
FIG. 1 is a block diagram of a mobile device in one example implementation.

The described embodiments generally make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities).

Certain embodiments relate to a method of displaying wireless mode indicators on a mobile device capable of communication through a cellular network and a wireless local area network (WLAN). The method comprises: determining a first connection status of the mobile device with respect to the cellular network and a second connection status with respect to the WLAN; and displaying a selected combination of icons in three display fields in a banner area of a display of the mobile device, the combination of icons being selected from a plurality of icon combinations based on the determined first connection status and second connection status.

The three display fields may comprise a signal strength field for displaying a signal strength icon, a network technology field for displaying a network technology icon and a WLAN field for displaying a WLAN icon. The icon selected to be displayed in the signal strength field may vary depending on the icon selected to be displayed in the network technology field. The WLAN icon may be an emphasized icon or a de-emphasized icon, corresponding to the second connection status being "active" or "inactive", respectively. The three display fields may be located together in a banner area. The network technology may be present or absent, depending on whether the first connection status is "active" or "inactive".

Further embodiments relate to a mobile device comprising: a processor; a display responsive to the processor; a plurality of wireless communication subsystems responsive to the processor; and a memory. The memory is accessible to the processor and stores program code executable by the processor for executing a user interface application. The user interface application is configured to determine a first connection status of the mobile device with respect to a cellular network and a second connection status with respect to a wireless local area network (WLAN). The user interface application, when executed by the processor, is further configured to cause the display to display a selected combination of icons in three display fields in a banner area of the display. The combination of icons is selected from a plurality of icon combinations based on the determined first connection status and the second connection status.

The three display fields may comprise a signal strength field for displaying a signal strength icon, a network technology field for displaying a network technology icon and a WLAN field for displaying a WLAN icon. The icons selected to be displayed in the signal strength field and the network technology field may vary depending on the icon selected to be displayed in the WLAN field. The icons selected to be displayed in the signal strength field may vary depending on the icon selected to be displayed in the network technology field. The WLAN icon may be absent, an emphasized icon or a de-emphasized icon, corresponding to the second connection status being "active" or "inactive", respectively. The network technology field is present or absent, depending on whether the first connection status is "active" or "inactive". The three display fields may be located together in a banner area.

Further embodiments relate to computer readable storage storing program instructions which, when executed by a processor of a mobile device, cause the processor to perform a method comprising the steps of: determining a first connection status of the mobile device with respect to the cellular network and a second connection status with respect to the WLAN; and displaying a selected combination of icons in three display fields in a banner area of a display of the mobile device, the combination of icons being selected from a plurality of icon combinations based on the determined first connection status and second connection status.

Figure 2:
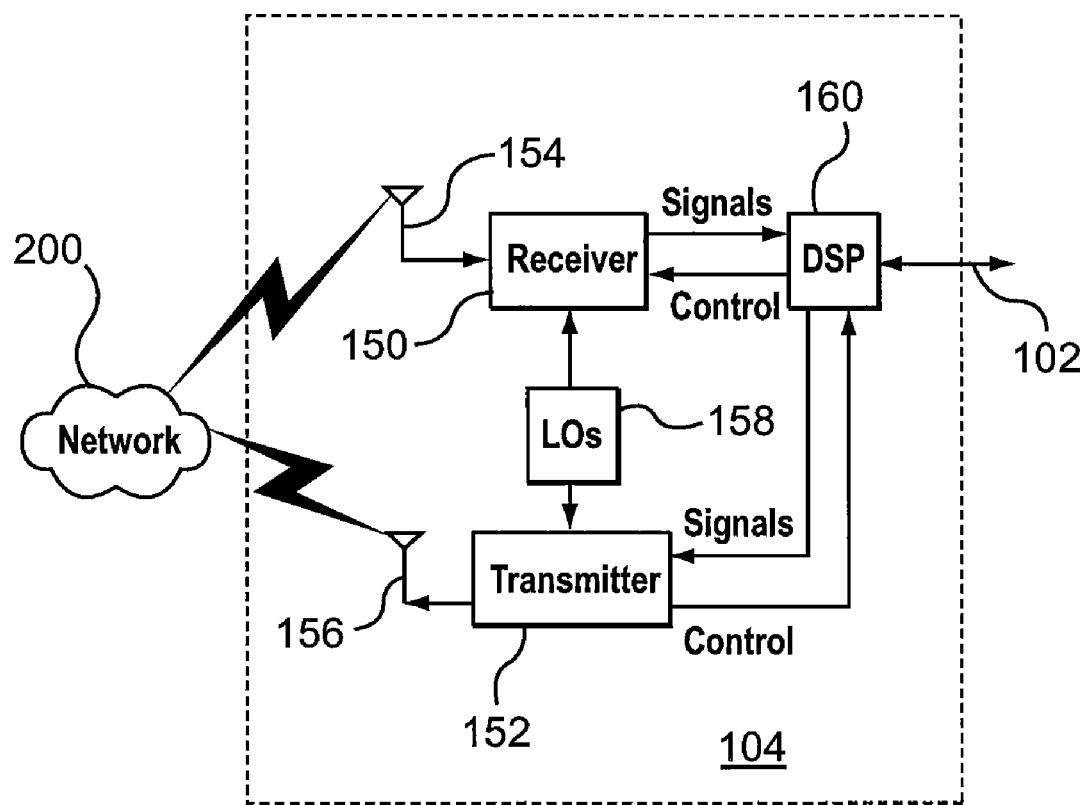
FIG. 2 is a block diagram of a communication sub-system component of the mobile device of FIG. 1.
Figure 3:
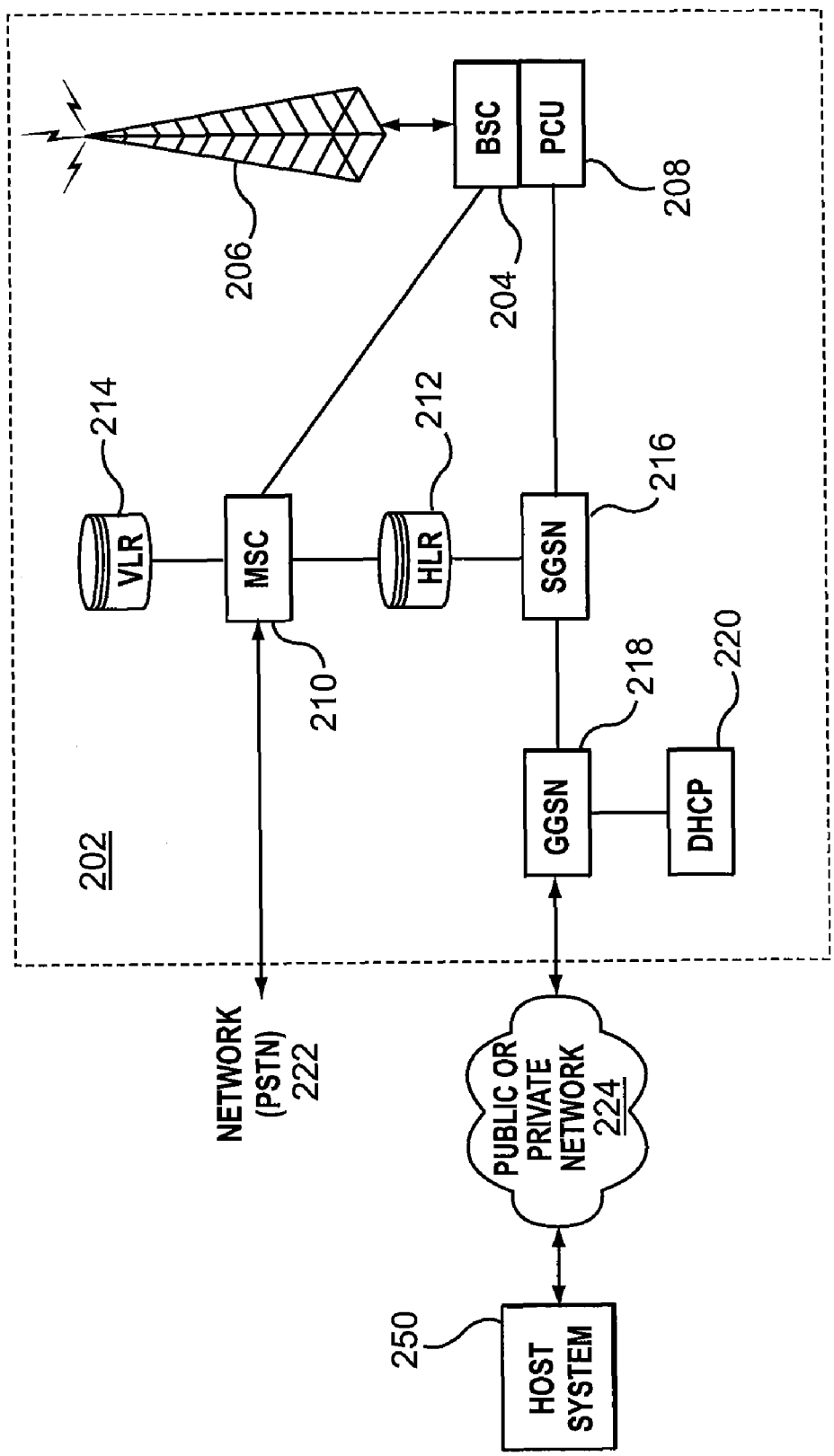
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Certain communication functions, including data and voice communications, are performed through communication subsystem 104. Communication subsystem 104 receives messages from and sends messages to a wireless network 200.

In this example implementation of mobile device 100, communication subsystem 104 is configured for cellular communication in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS).

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200.

By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130.

Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

For embodiments of mobile device 100 described hereinafter, the mobile device 100 is equipped and configured for communication over a cellular connection via communication subsystem 104 and with a wireless local area network (WLAN) using a communication form commonly termed "Wi-Fi". Such Wi-Fi connections may employ a suitable WLAN-compatible communication technology, of which unlicensed mobile access (UMA) technology is one example. UMA technology provides access to GSM and GPRS mobile services over unlicensed spectrum technologies, including Bluetooth™ and 802.11 wireless connections. UMA enables cellular network subscribers to roam and hand over between cellular networks and public and private wireless networks using dual-mode mobile handsets.

Optionally, mobile device 100 may also be configured for communication with local wireless devices, such as Bluetooth™ enabled devices and may be configured for communication in a global positioning system (GPS) context.

For purposes of illustration, aspects of mobile device 100 are described below in relation to FIGS. 4 to 9 as being configured and enabled for communication via a cellular network and a WLAN.

For communication within a WLAN, mobile device 100 may use the short-range communications subsystem 122 or other communications subsystems, such as may be provided by other device subsystems 124. WLAN communication is performed by mobile device 100 using a radio transceiver and antenna separate from the cellular communication subsystem 104 and employs a separate baseband processor (not shown) for digital signal processing.

Figure 4:
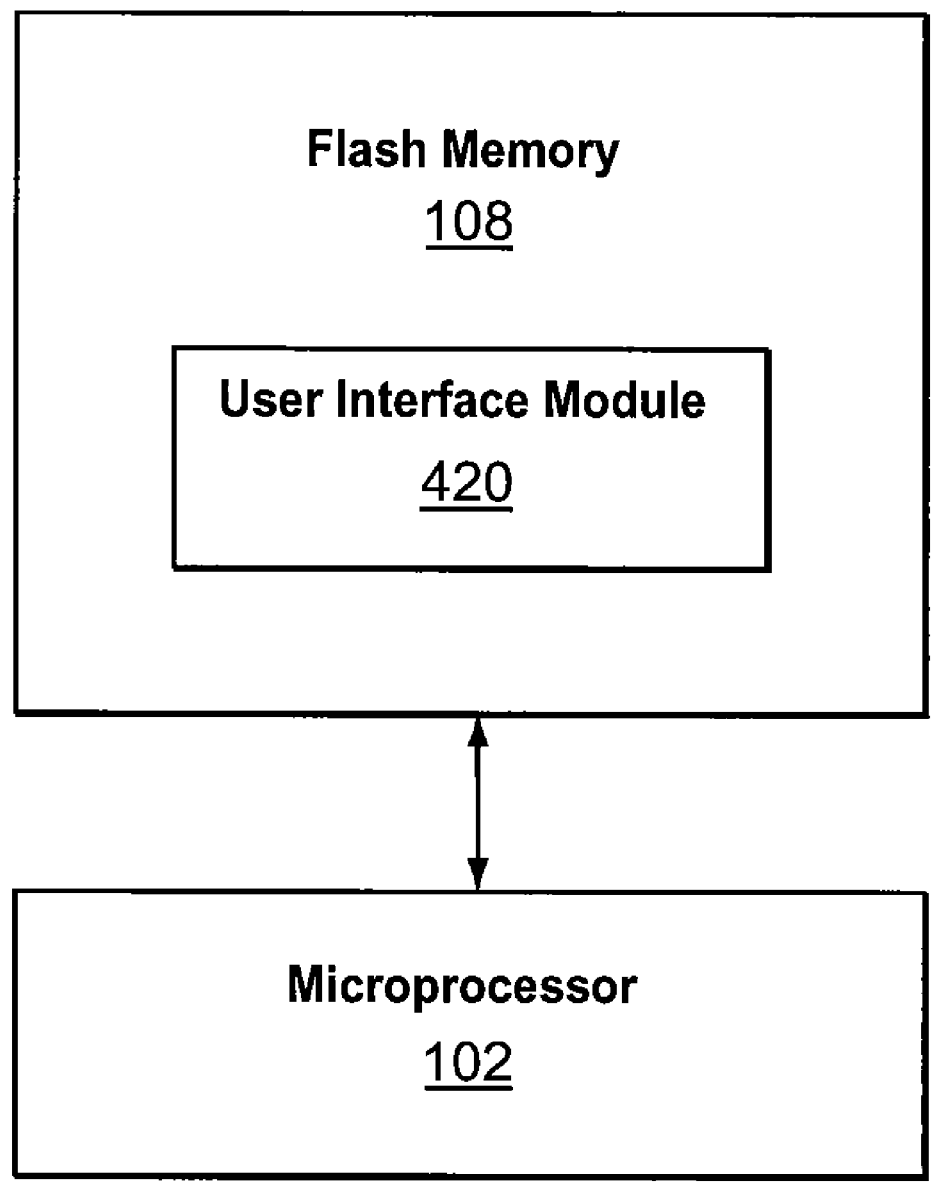
FIG. 4 is a block diagram of a flash memory of a mobile device in further detail.

Referring now to FIG. 4, flash memory 108 is shown in further detail. As shown in FIG. 4, flash memory 108 comprises a user interface module 420. Flash memory 108 comprises various other program code, such as operating system software and other software applications, although these are not specifically shown for purposes of simplicity of illustration.

User interface module 420 communicates with microprocessor 102 and the underlying wireless communications framework to determine the particular connection status of the Wi-Fi and cellular network connections. Based on the determined status connections, user interface module 420 generates a suitable visual display to be shown to the user of mobile device 100 on display 110, examples of which are shown in FIGS. 6 to 9.

In an alternative embodiment, mobile device 100 may employ a manage connections application (not shown) to interface with the communications framework of mobile device 100 for determining the connection status of the Wi-Fi and cellular network connections. The user interface module 420 can then extract the relevant connection status information from the manage connections application in generating a visual display on display 110.

User interface module 420 also facilitates the receipt of user input in relation to the images displayed on display 110. For example, selection of an icon, such as a "manage connections" icon, may be performed by using user interface module 420 to highlight an icon or drop-down menu item and then actuating an auxiliary I/O device 112 to "click" on the icon. However, display of a particular icon combinations in a banner area of display 110, as described below, is performed by user interface module 420 without requiring any specific input from the user.

Figure 5:
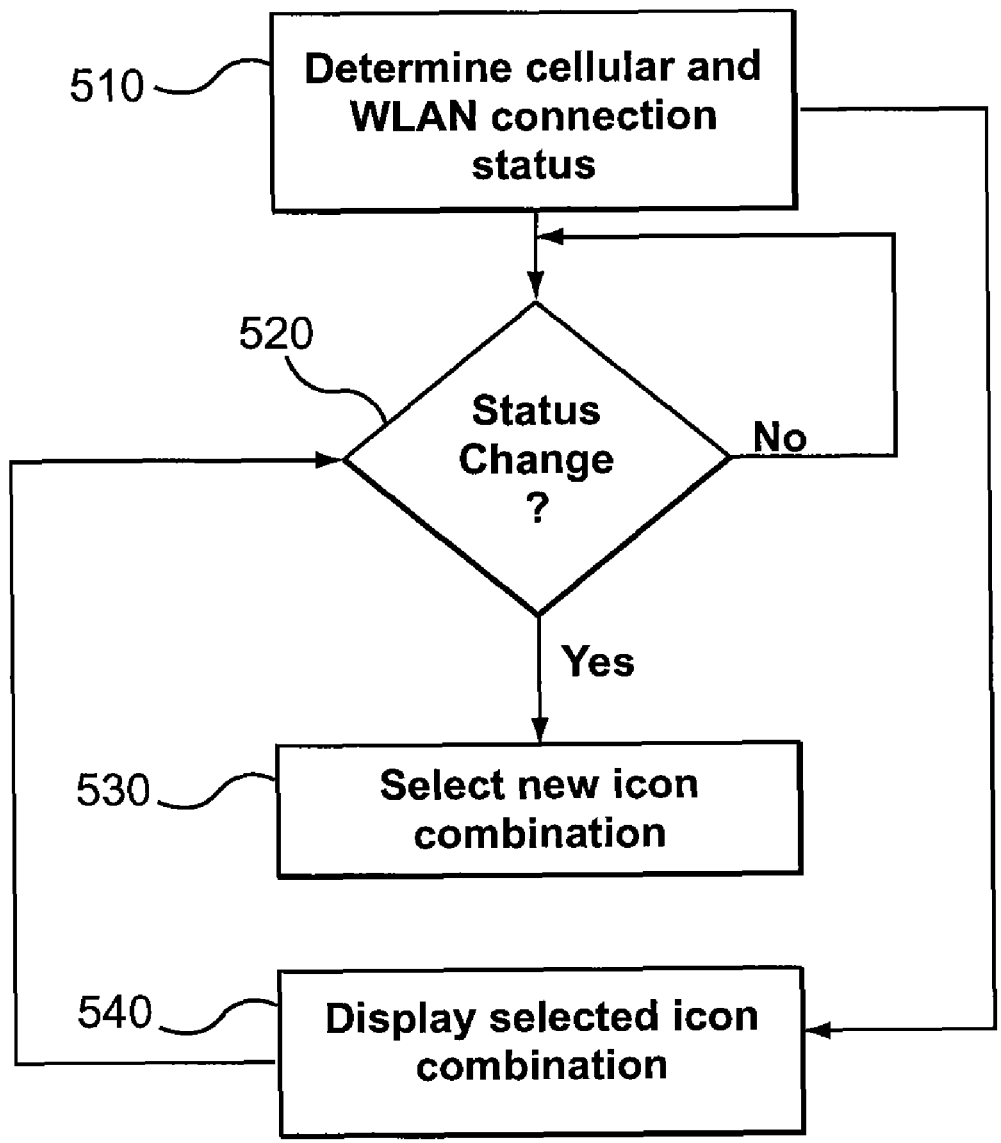
FIG. 5 is a flowchart of a method of displaying icon combinations representative of available wireless transmission modes.

Referring now to FIG. 5, there is shown a method 500 of displaying icon combinations representative of available wireless transmission modes, including cellular and WLAN connections. Method 500 begins at step 510, in which user interface module 420 (or a manage connections application interfacing with user interface module 420) determines the connection status of the cellular and WLAN connections enabled by mobile device 100. This may be done by querying the underlying communication framework of mobile device 100. Alternatively, the underlying communication framework may notify the user interface module 420 of the relevant connection statuses upon initialization and upon a change of connection status, without a query having to be made. The result of such connection status queries or notifications yields one of two connection states: "active"; and "inactive". These connection states are applicable to both the WLAN and cellular network connections although they may be graphically expressed in different ways.

Following step 510, an icon combination representative of the different connection statuses of the cellular and WLAN network connections is selected by user interface module 420 and displayed on display 110 of mobile device 100, at step 540. Further, while a home screen 610 (shown in FIGS. 6 to 9) is visible to a user, user interface module 420 continuously monitors the connection status of the WLAN and cellular network connections to determine, at step 520, whether any change in connection status has occurred. If a connection status change is determined to have occurred at step 520, then at step 530, user interface module 420 selects a new icon combination to appropriately reflect the new status and, at step 540, the selected icon combination is displayed on home screen 610 in a banner area 620 as shown in FIGS. 6 to 9. If, following display of the newly selected icon combination at step 540, the status again changes at step 520, steps 530 and 540 are repeated.

In order to facilitate selection and display of an appropriate icon combination, user interface module 420 may access a lookup table stored in flash memory 108 to determine which icon combination to display for a given WLAN and cellular connection status. User interface module 420 then causes the selected icon combination to be displayed in the three icon fields 622, 624 and 626, described below.

Figure 6:
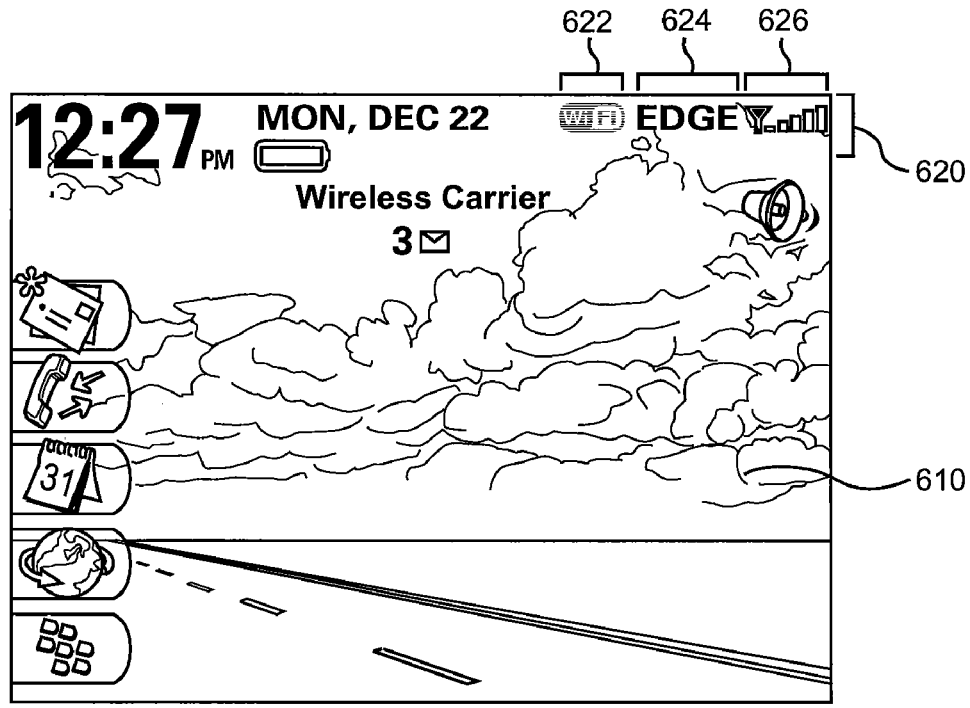
FIG. 6 is an example screenshot of a display of the mobile device, showing a first example icon combination.

Referring now to FIG. 6, there is shown an example screen shot of a home screen 610 displayed on display 110 of mobile device 100. Home screen 610 has a banner area 620 extending horizontally across a top portion of home screen 610. Banner area 620 has three fields 622, 624 and 626 toward the top right of home screen 610 for displaying a selected combination of icons to represent the connection status of the mobile device 100 with respect to the WLAN network connection and the cellular network connection.

Field 622 is used for displaying a "Wi-Fi" icon in one of two possible states: dimmed and emphasized, corresponding to inactive and active WLAN connections, respectively. Field 622 is thus a WLAN field indicative of the WLAN network connection status. Field 624 is a network technology field and field 626 is a signal strength field for indicating the relative signal strength of either the WLAN connection or the cellular connection.

Depending on the different connection statuses shown in the WLAN field 622, the icons displayed in the network technology field 624 and signal strength field 626 may vary. To illustrate the interdependence of the icons displayed in fields 622, 624 and 626, five different scenarios are described with reference to FIGS. 6 to 9.

In a first scenario, the user of mobile device 100 may be traveling with the mobile device 100 outside of the range of communication of any WLAN. Thus, the Wi-Fi icon in field 622 is shown to be dimmed to indicate that Wi-Fi is enabled but is not connected to a network. Thus, the Wi-Fi connection is, in effect "inactive". In this scenario, it is assumed that the mobile device 100 is within range of a cellular base station and is therefore in connection with the cellular network. Accordingly, field 624 displays an icon indicative or descriptive of the network technology through which the cellular network connection is established. In this scenario, carrier voice, carrier data, internet services and email services are all supported through the cellular network connection.

In the example illustrated in FIG. 6, field 624 contains the descriptive icon "EDGE". Depending on the network technology of the telecommunications carrier providing the cellular connection, field 624 may alternatively display a descriptive icon such as "GPRS" or another such descriptive indication of the network technology. Alternatively, instead of a descriptive indication in field 624, a symbolic indication, such as may be recognized as being associated with a particular network technology, may be used.

In FIG. 6, field 626 shows a signal strength icon that indicates the relative signal strength of the cellular network connection. Because the network connection is cellular, rather than a WLAN connection, the signal strength icon shown in field 626 is a cellular-specific signal strength icon. Thus, under the scenario where there is only a cellular connection available, the WLAN icon in field 622 is dimmed, the network technology icon in field 624 is present and shows a descriptive icon to indicate the existence of a cellular network connection and field 626 shows a signal strength icon indicative of a cellular network connection.

Figure 7:
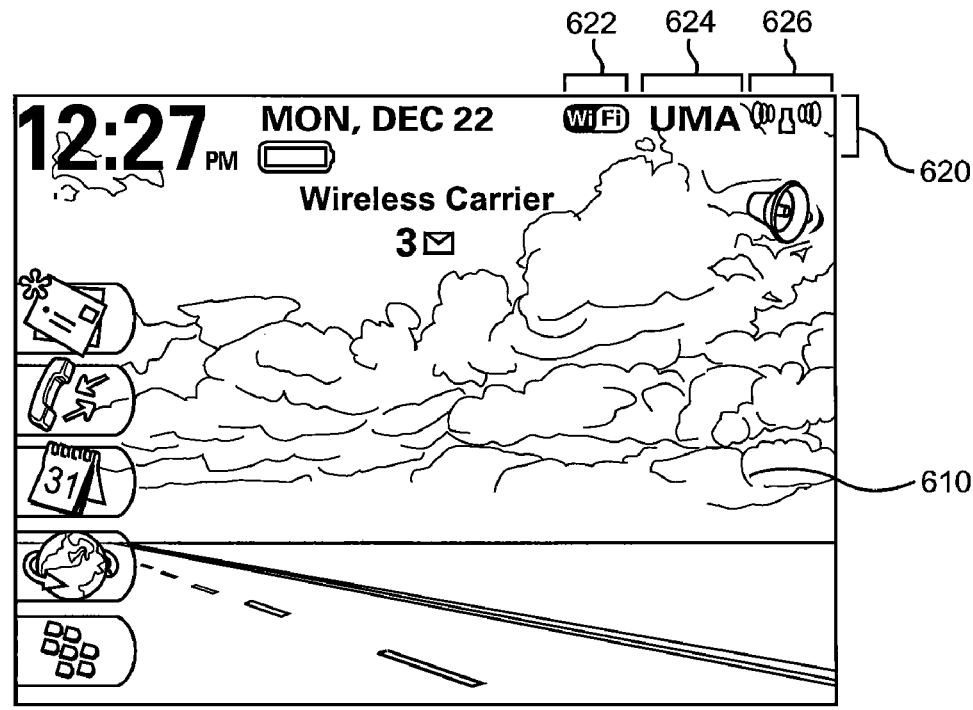
FIG. 7 is a further example screenshot of a display of the mobile device, showing a further example icon combination.

In a second scenario, the mobile device 100 is within range of a WLAN connection, such as a wireless hotspot that may be found in some cafes, airports or other publicly accessible locations, or the WLAN connection may be available to mobile device 100 through a wireless router located in the user's home, for example. In this scenario, it is assumed that the wireless connection is not made through a virtual private network (VPN). In this scenario, an icon combination, such as is shown in FIG. 7, may be used that indicates that the WLAN connection is active and WLAN field 622 shows an emphasized Wi-Fi icon. Although a cellular network connection may also be available to mobile device 100, cellular network services can be accessed using UMA over the WLAN connection, which is generally lower cost, so the network technology field 624 displays an icon corresponding to a network technology (UMA) employed by the WLAN, rather than one employed by the cellular network.

In the example shown in FIG. 7, network technology field 624 displays the descriptive icon "UMA" to indicate that the network technology employed by the WLAN connection is the UMA. Because there is a WLAN connection employing UMA, the signal strength icon displayed in field 626 is a different signal strength icon to that illustrated in FIG. 6 for a normal cellular network connection. The signal strength icon shown in field 626 in FIG. 7 is only shown where the network technology is UMA. In this scenario, all services (i.e. carrier voice, carrier data, internet services and email services) can be accessed through the WLAN using UMA and therefore there is no need to access any of these services through a cellular connection.

A third scenario may be considered that is similar to the second scenario, except that the mobile device 100 is connected through a private network, such as a company network, either by being located in physical proximity to the private network or by being connected from a remote location, such as home or a hotspot through a VPN connection. In this third scenario, the carrier voice, carrier data and internet services may be accessed through the UMA network technology, as these are public access services. However, the email service is privately accessed through the network via a Wi-Fi connection into the corporate WLAN (assuming that the email services are corporate email services). For this third scenario, the icon combination illustrated in FIG. 7 is also applicable.

Figure 8:
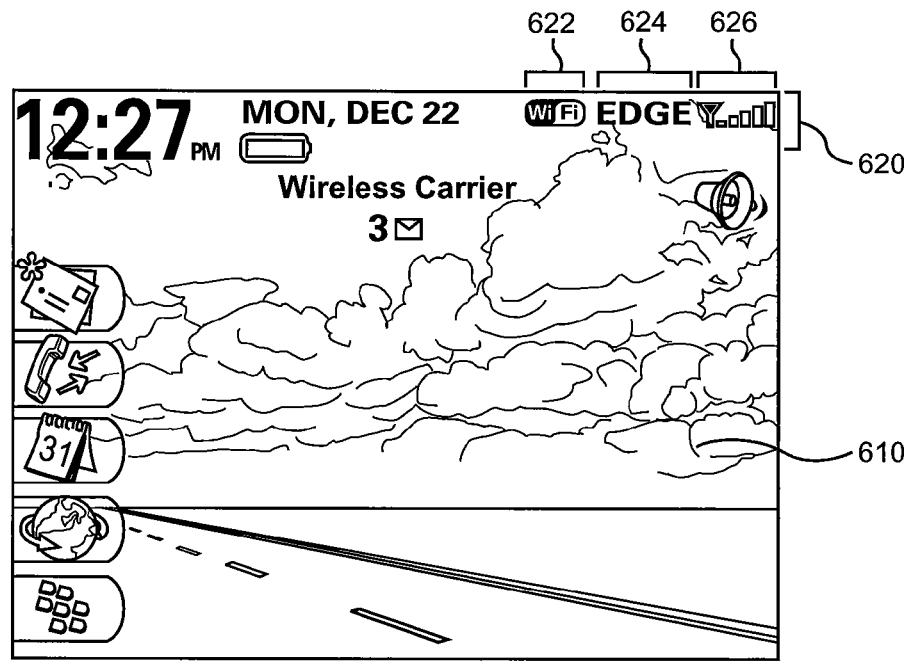
FIG. 8 is a further example screenshot of a display of the mobile device, showing a further example icon combination.

A fourth scenario may be illustrated with reference to FIG. 8, which shows a further icon combination in fields 622, 624 and 626. In this fourth scenario, the user may be carrying mobile device 100 at work, where for security reasons, the corporate environment has a firewall established against UMA connections. In such a case, the carrier voice, carrier data and internet services may be accessed through the cellular connection, while the corporate email services can be accessed through the local WLAN connection. Accordingly, it is necessary to show that the Wi-Fi connection is active by showing an emphasized Wi-Fi icon in the WLAN field 622 and also to show that the cellular connection is active by providing a descriptive icon such as "EDGE" in network technology field 624. As the dominant wireless services connection is cellular, the signal strength icon displayed in field 626 is specific to a cellular connection, rather than a WLAN connection.

Figure 9:
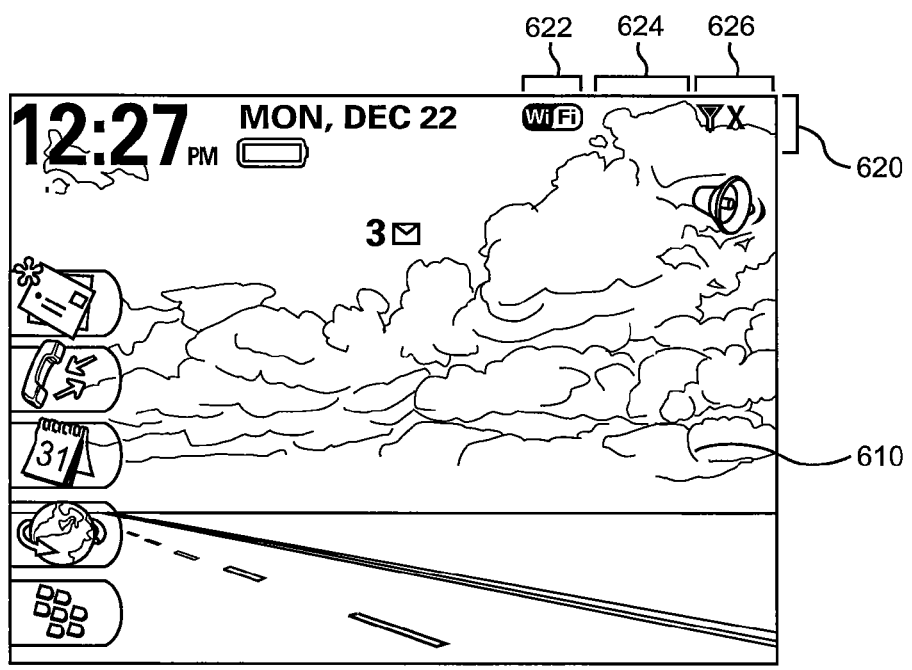
FIG. 9 is a further example screenshot of a display of the mobile device, showing a further example icon combination.

In a fifth scenario illustrated with reference to FIG. 9, the mobile device 100 may be out of range of a cellular basestation, but within range of a WLAN connection. This may occur, for example, where the user has a local wireless router at home that is connected through a cable or a landline to a public network, although the home may be outside of cellular range. In this scenario, carrier voice, carrier data and internet services may be unavailable to mobile device 100, although email services may be available via the Wi-Fi connection to the local wireless router.

In the fifth scenario, because the WLAN connection is active, an emphasized Wi-Fi icon is displayed in WLAN field 622. As mobile device 100 is out of range of the cellular network, no cellular network based services are available and no cellular network technology can be employed by mobile device 100. Accordingly, a network technology icon is absent from network technology field 624. As there is no cellular connection, the signal strength field 626 shows an icon indicative of a cellular network connection with no signal strength.

While the example screen shots of home page 610 show a banner area 620 with various icon combinations in fields 622, 624 and 626, in the top right hand portion of home screen 610 and of banner area 620, it should be understood that home screen 610 may be effected using alternative positioning and/or orientation of banner area 620 and fields 622, 624 and 626. For example, banner area 620 may be vertically aligned along a leftmost or rightmost portion of home screen 610. Alternatively banner area 620 may be aligned horizontally along the bottom of home screen 610.

Because banner space in banner area 620 is usually at a premium and it is undesirable to clutter the banner area with too many icons or too much information, use of a small fixed number of icon fields, such as three, may be used as described herein to efficiently disclose relevant wireless modes and connection statuses to the user of mobile device 100.

While the precise positioning of fields 622, 624 and 626 is a matter of esthetic preference, in order for the meaning of the particular icon combination displayed to be apparent to the user, fields 622, 624 and 626 should be displayed together, although not necessarily in the left to right order shown in the examples in FIGS. 6 to 9.

It should be understood that the scenarios described herein and the example icon combinations shown in FIGS. 6 to 9 are illustrative rather than exhaustive and that other icon combinations may be used for other scenarios and other network technologies.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting.

The invention claimed is:

1. A method of displaying wireless mode indicators on a mobile device capable of communicating through a cellular network and a short-range communication network, the method comprising:
   determining a first connection status of the mobile device with respect to the cellular network and a second connection status with respect to the short-range communication network; and
   selecting a combination of icons to be displayed in a plurality of display fields on a display of the mobile device, wherein a plurality of icon combinations are stored in a memory of the mobile device, and wherein the combination of icons is selected from the stored plurality of icon combinations based on the determined first connection status and second connection status, wherein the plurality of display fields comprise a signal strength field for displaying a signal strength icon and a network technology field for displaying a network technology icon.

2. The method of claim 1, wherein the icon selected to be displayed in the signal strength field varies depending on whether the first connection status is "active" or "inactive".

3. The method of claim 1, wherein the plurality of display fields comprise a short-range communication field for displaying a short-range communication icon, and wherein the icons selected to be displayed in the signal strength field and the network technology field vary depending on whether the second connection status is "active" or "inactive".

4. The method of claim 1, wherein the short-range communication icon is an emphasized icon or a de-emphasized icon, corresponding to the second connection status being "active" or "inactive", respectively.

5. The method of claim 1, wherein, if the second connection status is "active", the icon selected to be displayed in the network technology field varies depending on availability of an unlicensed mobile access (UMA) connection.

6. The method of claim 1, wherein the network technology field is present or absent, depending on whether the first connection status is "active" or "inactive".

7. The method of claim 1, wherein the icon selected to be displayed in the signal strength field varies depending on whether the first connection status is "active" or "inactive".

8. The method of claim 1, wherein the plurality of display fields are located together in a banner area.

9. The method of claim 1, wherein the plurality of icon combinations are identified in a lookup table stored in the memory.

10. A mobile device comprising:
   a processor;
   a display responsive to the processor;
   a plurality of wireless communication subsystems responsive to the processor; and
   a memory accessible to the processor and storing program code executable by the processor for executing a user interface application, wherein the user interface application is configured to determine a first connection status of the mobile device with respect to a cellular network and a second connection status with respect to a short-range communication network; and
   wherein the user interface application, when executed by the processor, is further configured to, select a combination of icons to be displayed in a plurality of display fields on the display, wherein a plurality of icon combinations are stored in a memory of the mobile device, and wherein the combination of icons is selected from the stored plurality of icon combinations based on the determined first connection status and second connection status, wherein the plurality of display fields comprise a signal strength field for displaying a signal strength icon and a network technology field for displaying a network technology icon.

11. The device of claim 10, wherein the icon selected to be displayed in the signal strength field varies depending on whether the first connection status is "active" or "inactive".

12. The device of claim 10, wherein the plurality of display fields comprise a short-range communication field for displaying a short-range communication icon, and wherein the icons selected to be displayed in the signal strength field and the network technology field vary depending on whether the second connection status is "active" or "inactive".

13. The device of claim 10, wherein the short-range communication icon is an emphasized icon or a de-emphasized icon, corresponding to the second connection status being "active" or "inactive," respectively.

14. The device of claim 10, wherein, if the second connection status is "active", the icon selected to be displayed in the network technology field varies depending on availability of an unlicensed mobile access (UMA) connection.

15. The device of claim 10, wherein the network technology field is present or absent, depending on whether the first connection status is "active" or "inactive".

16. The device of claim 10, wherein the icon selected to be displayed in the signal strength field varies depending on whether the first connection status is "active" or "inactive".

17. The device of claim 10, wherein the plurality of display fields are located together in a banner area.

18. The device of claim 10, wherein the plurality of icon combinations are identified in a lookup table stored in the memory.

19. A computer readable storage medium storing program instructions which, when executed by a processor of a mobile device capable of communicating through a cellular network and a short-range communication network, cause the processor to perform a method of displaying wireless mode indicators on the mobile device, the method comprising:
   determining a first connection status of the mobile device with respect to the cellular network and a second connection status with respect to the short-range communication network; and
   selecting a combination of icons to be displayed in a plurality of display fields on a display of the mobile device, wherein a plurality of icon combinations are stored in a memory of the mobile device, and wherein the combination of icons are selected from the stored plurality of icon combinations based on the determined first connection status and second connection status, wherein the plurality of display fields comprise a signal strength field for displaying a signal strength icon and a network technology field for displaying a network technology icon.

* * * * *